(12) United States Patent
Khan et al.

(10) Patent No.: US 8,489,134 B2
(45) Date of Patent: Jul. 16, 2013

(54) SYSTEM AND METHOD FOR PROVIDING PRESENCE BASED TRUNKING IN A NETWORK ENVIRONMENT

(75) Inventors: Zeeshan Khan, Fremont, CA (US); Keith Edmund O'Brien, Metuchen, NJ (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 697 days.

(21) Appl. No.: 12/202,450

(22) Filed: Sep. 2, 2008

(65) Prior Publication Data

US 2010/0056196 A1 Mar. 4, 2010

(51) Int. Cl.
| | |
|---|---|
| *H04B 7/185* | (2006.01) |
| *H04B 7/00* | (2006.01) |
| *H04W 4/00* | (2009.01) |
| *H04L 12/66* | (2006.01) |
| *H04L 27/28* | (2006.01) |
| *H04L 27/00* | (2006.01) |
| *H04L 29/06* | (2006.01) |
| *H04K 1/10* | (2006.01) |
| *H04M 3/42* | (2006.01) |
| *G06F 15/173* | (2006.01) |
| *H04N 7/20* | (2006.01) |

(52) U.S. Cl.
USPC ....... 455/518; 455/12.1; 455/426.1; 455/519; 370/328; 370/338; 370/352; 375/260; 375/295; 375/324; 379/201.1; 709/226; 709/238; 713/163; 725/63

(58) Field of Classification Search
USPC ............. 455/12.1, 13.1–13.328, 4, 17, 404.2, 455/450, 451, 452.1, 452.2, 452.3, 452.4, 455/456.1, 456.2, 456.3, 518, 519, 520, 521; 370/328, 329, 338, 351, 352; 379/201.1, 379/202.01, 266.1; 709/224, 226, 227, 238, 709/249

See application file for complete search history.

(56) References Cited

U.S. PATENT DOCUMENTS

| | | |
|---|---|---|
| 6,507,562 B1 | 1/2003 | Kadansky et al. |
| 6,507,586 B1 | 1/2003 | Satran et al. |
| 6,741,575 B1 | 5/2004 | Zhang et al. |
| 6,981,032 B2 | 12/2005 | Boivie et al. |
| 7,035,258 B2 | 4/2006 | Alam et al. |
| 7,095,739 B2 | 8/2006 | Mamillapalli et al. |
| 7,133,502 B2 | 11/2006 | Wolters et al. |
| 7,248,598 B2 | 7/2007 | Couty |
| 7,275,111 B2 | 9/2007 | Cabrera et al. |
| 7,389,359 B2 | 6/2008 | Jain et al. |
| 2002/0118638 A1* | 8/2002 | Donahue et al. ............... 370/229 |
| 2003/0063608 A1* | 4/2003 | Moonen ......................... 370/390 |
| 2004/0143663 A1* | 7/2004 | Leedom et al. ................ 709/226 |
| 2005/0097317 A1* | 5/2005 | Trostle et al. .................. 713/163 |
| 2006/0252444 A1* | 11/2006 | Ozugur .......................... 455/519 |
| 2007/0028002 A1* | 2/2007 | McCanne ....................... 709/238 |
| 2007/0036100 A1* | 2/2007 | Shaffer et al. .................. 370/328 |

(Continued)

*Primary Examiner* — Andrew Wendell
*Assistant Examiner* — Paul P Tran
(74) *Attorney, Agent, or Firm* — Patent Capital Group (57) ABSTRACT

A method is provided in one example implementation and the method includes interacting, via a first communication resource manager located in a first domain, with a second communication resource manager located in a second domain. The method further includes determining whether to establish a link for multicasting between users in the first domain and users in the second domain, and the link between the domains is established based on presence data of at least one user in the first domain and at least one user in the second domain.

15 Claims, 4 Drawing Sheets

U.S. PATENT DOCUMENTS

| | | | |
|---|---|---|---|
| 2008/0056295 A1* | 3/2008 | Loda et al. | 370/437 |
| 2008/0153531 A1* | 6/2008 | O'Shaughnessy et al. | 455/518 |
| 2008/0298330 A1* | 12/2008 | Leitch | 370/338 |
| 2009/0190734 A1* | 7/2009 | White et al. | 379/201.02 |

* cited by examiner

SYSTEM AND METHOD FOR PROVIDING PRESENCE BASED TRUNKING IN A NETWORK ENVIRONMENT

TECHNICAL FIELD OF THE INVENTION

This invention relates in general to the field of communications and, more particularly, to a system and a method for providing presence based trunking in a network environment.

BACKGROUND OF THE INVENTION

Networking services have become increasingly important in today's society. In certain architectures, service providers may seek to offer multicast services for their end users. 'Multicast' refers to the delivery of information to a group of destinations simultaneously using the most efficient strategy. Delivery of messages over each link of the network happens only once: creating copies only when the links to the destinations split.

IP Multicast is a technique for one, to many, communications over an IP infrastructure. It scales to a larger receiver population by not requiring prior knowledge of whom or how many receivers are present. Multicast utilizes network infrastructure efficiently by requiring the source to send a packet only once, even if it needs to be delivered to a large number of receivers. The nodes in the network take care of replicating the packet to reach multiple receivers.

An IP Multicast group address is used by sources and by the receivers to send and receive content. Sources use the group address as the IP destination address in their data packets. Receivers use this group address to inform the network that they are interested in receiving packets sent to that group. At the forefront of all these operations is cost because the links that carry this data are expensive.

Accordingly, the ability to optimize communication links in the context of multicasting activities presents a significant challenge to network administrators, component manufacturers, and system designers alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Overview

A method is provided in one example implementation and the method includes interacting, via a first communication resource manager located in a first domain, with a second communication resource manager located in a second domain. The method further includes determining whether to establish a link for multicasting between users in the first domain and users in the second domain, and the link between the domains is established based on presence data of at least one user in the first domain and at least one user in the second domain.

Figure 1:
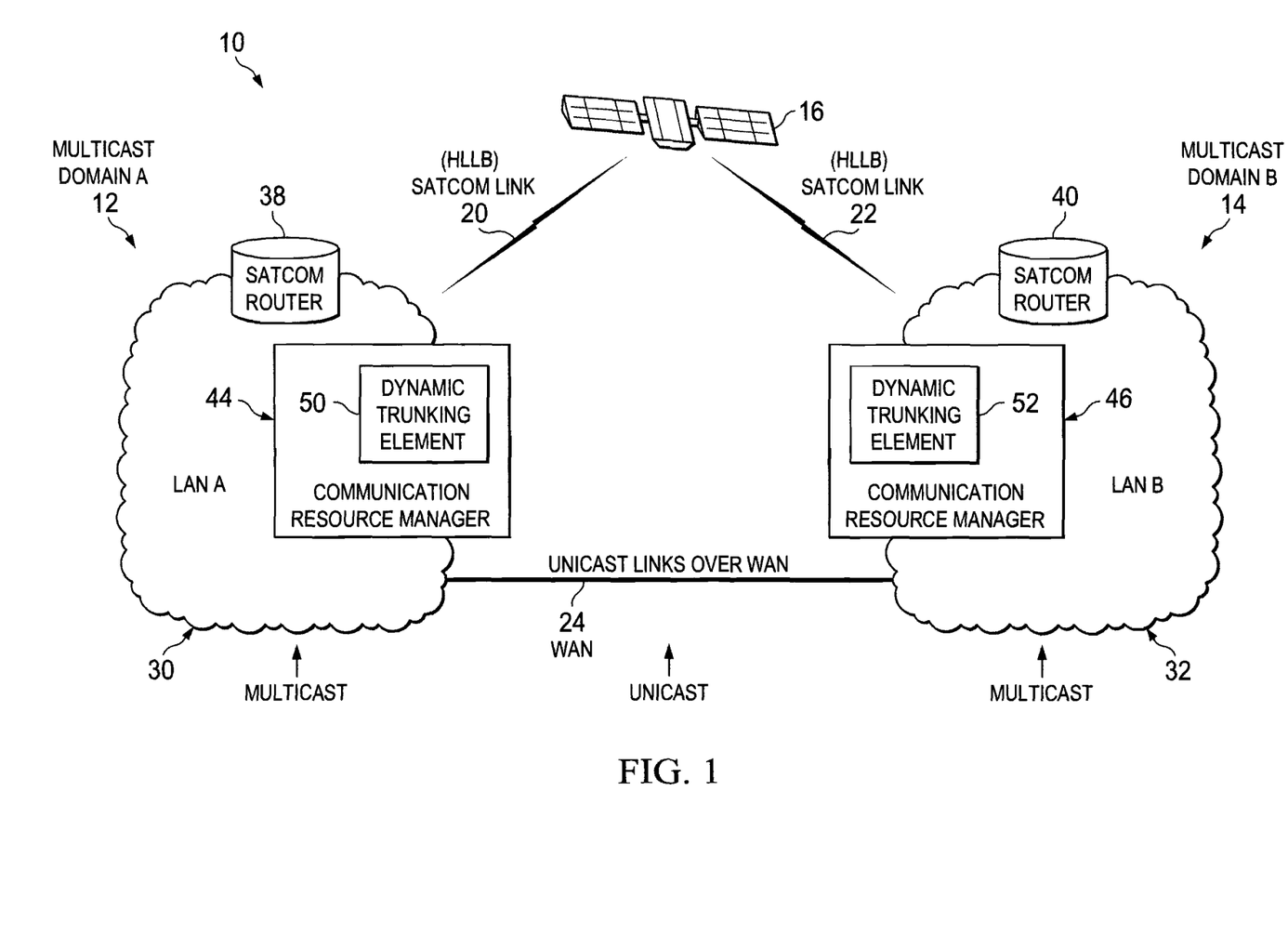
FIG. 1 is a simplified block diagram of a communications system for enabling multicast services in a network environment in accordance with one embodiment of the present invention.

FIG. 1 illustrates a communication system 10 that includes a Multicast Domain A 12, which further includes a local area network (LAN) A 30. In a 'multicast domain' the traffic does not automatically flow between domains. Communication system 10 also includes a Multicast Domain B 14, which includes a LAN B 32. In addition, communication system 10 includes a satellite 16, a high-latency low bandwidth (HLLB) set of links 20, 22, and a wireless area network (WAN) 24 link. This nailed link connects unicast over WAN such that, from left to right, a communication would propagate from Multicast to Unicast to Multicast (MUM), thereby creating a MUM protocol.

Figure 2:
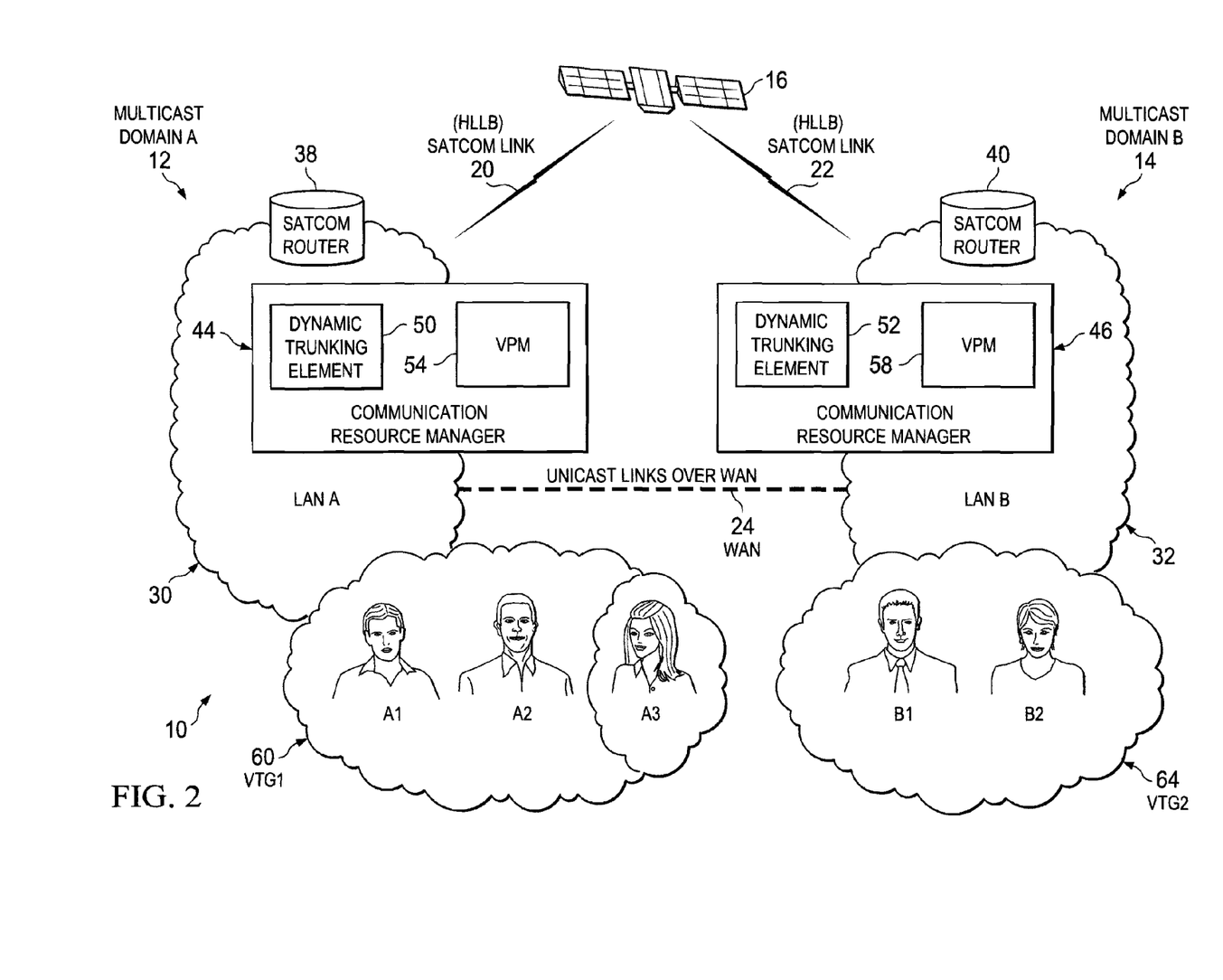
FIG. 2 is a simplified block diagram of the communication system where a link is being dynamically provided.

LAN A and LAN B include respective SatCom routers 38 and 40, communication resource managers 44 and 46, and dynamic trunking elements 50 and 52. A set of virtual talk group (VTG) presence managers (VPMs) 54 and 58 are also provided within communication resource managers 44 and 46, respectively (the VPMs are shown in FIG. 2). Note that any of the items within communication resource managers 44 and 46 could be provided external to these components, where appropriate, or alternatively combined, based on particular configuration needs.

Before turning to some of the components of embodiments of the present invention, some preliminary information about a typical multicast protocol is provided. It is beneficial to provide an overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

When the IP network spans over satellite links, special considerations should be applied to preserve bandwidth and minimize operational costs. Communications links are typically provided between communicating entities, but these links are not optimized. Common deployment topologies over (for example) WAN and SatCom arrangement include a combination of multicast and unicast links using Multicast-Unicast-Multicast (MUM) configurations. Pre-configured networks will universally pre-allocate expensive bandwidth, which may lie idle if not planned correctly. When a dynamic trunk configuration is used, a unicast link over a SatCom link is brought up dynamically, only when a multi-zone VTG is activated.

Despite the fact that the dynamic trunk configuration is a major improvement over a pre-configured static MUM configuration, it still has the drawback of establishing a SatCom link even when the remote site does not have any active relevant participants in it. Thus, many systems provide communication over SatCom, but these are simply pre-configured or get brought up upon establishment of VTGs. What is needed is an efficient and cost effective trunking system that reserves and brings-up expensive trunks only when needed.

Within these multicast islands or domains of FIG. 1, packets flow freely. In FIG. 1, this would allow groups within Multicast Domain A (item #12) to communicate with each other without restraint. Similarly, multicast communications can readily propagate within Multicast Domain B (item #14).

Figure 3:
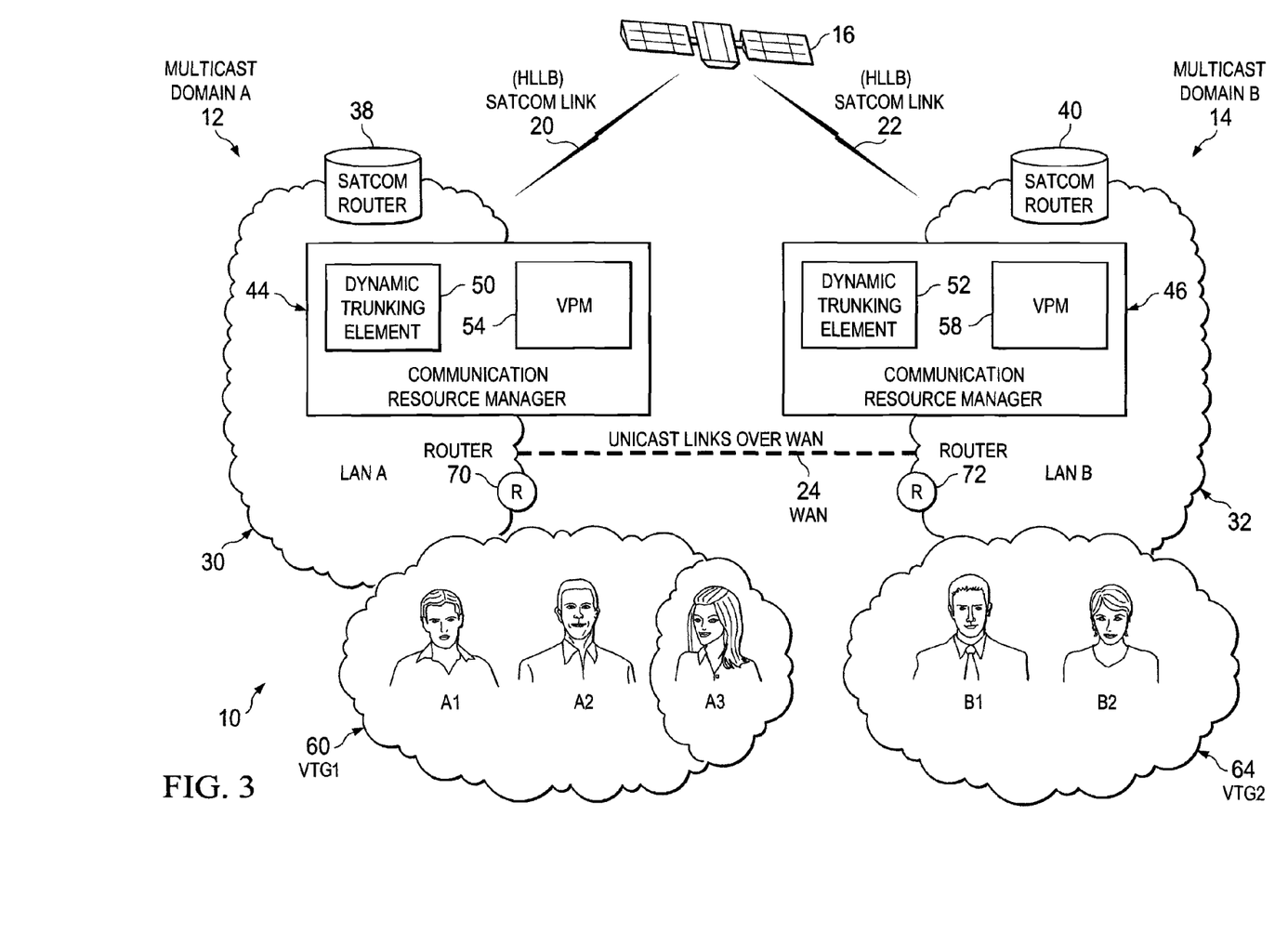
FIG. 3 is a simplified block diagram of the communication system where a link is dynamically provided based on presence information.

However, once the domain is crossed, the multicast packets are not necessarily forwarded. The way around this issue is through a unicast trunking configuration. The unicast trunk can be thought of as a hardwired bridge between these two islands or domains. This allows the forwarding operations to occur. Typically, the router configuration will reserve some bandwidth for such operations (these routers are illustrated in FIG. 3 and further detailed below). Note that bandwidth reservations are generally based on user needs, compression requirements, etc. and this algorithm can be complex.

In accordance with the teachings of the present invention, communication system 10 provides a mechanism that utilizes location and presence information to facilitate dynamic network configurations. In general, when a VTG presence manager (VPM) detects that a VTG in a remote site does not have any active users logged into the system, the VPM (in cooperation with dynamic trunking elements 50 and 52) brings down the SatCom link between this location and all other locations. Similarly, as the system detects that there is at least one user present at each location of a multi-location VTG, it dynamically brings up a SatCom link between the two locations. VPMs 54 and 58 can be part of the communication resource managers 44 and 46 respectively, where one VPM is provided in each respective domain. Once a link is made between the two domains, a multi-location VTG is established and functional.

One embodiment of the present invention reduces the operational cost of systems by tearing down expensive SatCom links when they are not needed. Not only is there a considerable cost savings in implementing such a concept, the system also hides the complexity of networking by facilitating a proverbial one click selection of (e.g., PTT) channels and the associated multimedia feeds, while setting up networking behind the scenes. Furthermore, the system is intelligent enough to take into account the capabilities and bandwidth requirements of the endpoints in each location, and it responds by bringing up bandwidth to match the needs of end users. The VPM monitors the number of users present at each site. It then conveys this information to communication resource managers 44 and 46, which use this information to maintain an appropriate link bandwidth.

In operation of a brief example, there is a VPM associated with each location and this can be part of communication resource managers 44 and 46. The VPM tracks the presence of users associated with VTGs in each location. In the event that the VPMs (on both sides of the newly established link) determine that there are users in both locations, the VPMs maintain the newly established link between the locations. However if either one of the VPMs determine that there are no active users logged into the system in the location it monitors, the VPM tears down the link and enters into a 'Link down due to no local user presence' state. Users in the other location can be informed that the link is down because there are no users in the remote site. This provides an indication that the link is down for cost saving reasons, rather than because of any technical issues.

Communication resource managers 44 and 46 continuously monitor their respective domains for the presence of users (users logging in and out of the system). When the remote communication resource manager (44 or 46) detects that a user has logged into the system, it checks the state of the system. If the system state indicates that the new user does not need to be in a multi-site VTG, or if the system determines that the SatCom already exists for the multi-site VTG, the operation continues unaltered.

However if a new user logs into the system when it is in the "Link down due to no local user presence" state, the system brings up the link (e.g., a SatCom link). As soon as the SatCom link is up, communication is established between communication resource managers 44 and 46 in order to determine if users are present on both sides of the link. The operation continues as described above. Once the SatCom link is brought up, it is kept up as long as the VTG is active and communication resource managers 44 and 46 (on both sides) of the link detect that users are present in both locations. Once communication resource managers 44 and 46 on either side detect that they have no users present in a given multi-location VTG, they communicate the state to the remote entity and tear down the SatCom link.

In accordance with one aspect of the invention, communication resource managers 44 and 46 bring up links having only the bandwidth required for the applications used by the user. For example, if communication resource managers 44 and 46 determine that a user is utilizing a video application, they will bring up a link with a broad bandwidth. Alternatively, if they determine that a user is utilizing only a voice application, they would reserve and bring up a low bandwidth link. Similarly, if communication resource managers 44 and 46 detect that the endpoints of users in a remote location have only text applications, they would bring up a narrow bandwidth link.

In yet another embodiment, dynamic trunking elements 50 and 52 (in cooperation with the endpoints) automatically configure the system to select transcoding based on the available bandwidth. As a result, the endpoints are dynamically configured to ramp down the codec on the SatCom link, based on the available bandwidth over the SatCom link. Note that each SatCom link may adjust its codec according to the specific bandwidth it is able to reserve.

In accordance with another aspect of the invention, communication resource managers 44 and 46 track the number of present users and their bandwidth needs. For example, if the system allows multiple users to transmit simultaneously, the system may increase the bandwidth between the two locations based on the number of users present at each location. In a communications environment, dynamic trunking elements 50 and 52 would bring up the SatCom link when a first user logs into the system. Dynamic trunking elements 50 and 52 would increase the bandwidth of the link as a second and a third user log into the remote location. However, as the forth fourth user logs into the system, dynamic trunking elements 50 and 52 would leave the bandwidth of the link unaltered, as communication system 10 would not allow more than three users to transmit voice simultaneously (in this example). Other implementations of the present invention are more robust and can accommodate more users.

Turning now to some of the infrastructure for achieving these operations, in FIG. 2 there are two sets of VTGs provided as VTG1 60 (inclusive of persons A1, A2, and A3) and VTG2 62 (inclusive of persons B1 and B2). VTG1 60 is part of Multicast Domain A 12, while VTG2 64 is part of Multicast Domain B 14. WAN 24 couples Multicast Domain A (12) and Multicast Domain B (14). WAN 24 also has a connection to the aforementioned routers.

These routers are configured in such a way that they will take a specific multicast address from Multicast Domain A (12), take the medium from that (e.g., voice), and position it into a specific nailed connection between these domains. Ultimately, the voice data would arrive at Multicast Domain B (14). In a static configuration, all multicasting being generated by Multicast Domain A (12) gets sent across this WAN 24 and it arrives at Multicast Domain B (14). In a nailed connection, WAN 24 is in an 'ALWAYS ON' mode. The connection does have some convenience for the VTGs 60 and 64, but the connection is expensive. Whether the connection is using fiber technology, or employing the use of HLLB SatCom links 20 and 22, there is a considerable cost burden.

Instead of pre-reserving this expensive bandwidth along these hardwired links, an on-demand protocol can be employed such that when an immediate need surfaces, the bridge would be established between two locations. In the example case of FIGS. 2 and 3, WAN 24 is illustrated as a dashed line: indicating that it is not a hardwired connection. In the example of FIG. 2, there are two distinct groups that actively interact within their respective groups. Occasionally, however, there is an issue that necessitates someone from VTG1 60 to communicate with VTG2 64. FIG. 2 can be viewed as a second phase of the optimization, where VTG2 64 will spawn the WAN 24 connection. As explained further below, FIG. 3 illustrates a scenario in which the WAN 24 connection is brought up based on the detected presence of individuals.

Turning now to FIG. 3, when there is a need to initiate a communication between VTG1 60 and VTG2 64, routers 70 and 72 create an immediate connection via WAN 24. In essence, the pipe between these VTGs is brought up between the routers to service these groups. Subsequently, when the event concludes, dynamic trunking elements 50 and 52 take down the nailed connection. Therefore, the cost drops considerably because the hard connection usage is being minimized.

Note that the creation of VTGs does not mean that these members are necessarily utilizing the WAN or SatCom links. There is a difference between establishing the infrastructure necessary to potentially communicate over the link, and actually using the link for multicasting operations. Again, the issue here becomes cost, as often times links are incurring cost while not being used.

The final phase of the teachings of the present invention involves systematically detecting the presence of individuals. In one example, a simple log-in could be used to verify a person's presence on the system. For example, if the trunk is essentially ON and if there is a VTG that requires it, then the dynamic trunk is brought up. Thus, trunks are only connected when people are present and ready to utilize them at that instant. Even though the VTG has been configured, the costs will not begin tolling until the presence information is confirmed.

Communication resource managers 44 and 46 will give direction to routers 70 and 72 (respectively) in bringing up and dynamically configuring these trunks. Dynamic trunking elements 50 and 52 can assist in this coordination and empower communication resource managers 44 and 46 to give intelligent instructions to routers 70 and 72. Note that in other embodiments, these routers 70 and 72 are not part of this equation and the system operates with just the satellite links. In such a scenario, the separate WAN 24 link is unnecessary.

Note that there is somewhat of a "Catch 22" issue here: How should the whole process be initiated? This can be addressed in the following manner. Communication resource managers 44 and 46 help to coordinate this initial connection. There will be a momentary connection between communication resource managers 44 and 46: both of these devices can detect a quorum (at least one person, for example) for their respective VTGs and that information can be relayed over to the other side.

Presume that person A3 has come into the office and logged into her respective system in LAN A. Communication resource manger 44 would relay this information to communication resource manager 46 and query if there is at least one other user in that VTG. If there are no end users on the other side, then the connection is torn down. Thus, there is a short-term establishment of the connection in order to determine presence information on the other side, but when there is no presence on the other side, the connection is not maintained (e.g., for an unduly extensive timeframe). In this sense, costs are strategically controlled, particularly so when there is not a need to have a connection up and running.

Software and/or hardware (inclusive of memories and processors that can execute any software application) may reside in communication resource managers 44 and 46, in dynamic trunking elements 50 and 52, in routers 70 and 72, and in VPMs 54 and 58 in order to achieve the teachings of optimizing multicasting operations of the present invention. These components may be consolidated, or any one of these can be eliminated or added to the system elsewhere while remaining within the broad scope of the present invention. However, due to their flexibility, these items may alternatively be equipped with (or include) any suitable algorithm, hardware, component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of these outlined configurations in the context of communication system 10 and, accordingly, they should be construed as such.

Figure 4:
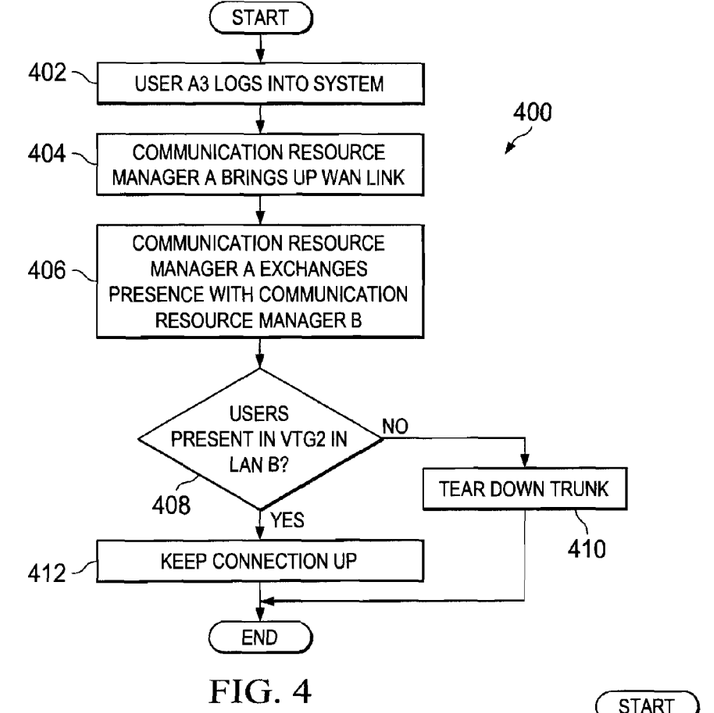
FIGS. 4-5 are simplified flowcharts illustrating a series of example steps associated with a method for intelligently establishing links for multicast services in the communication system.
Figure 5:
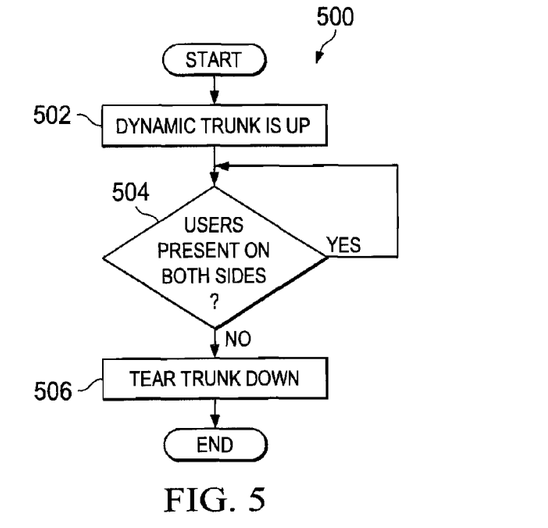

FIGS. 4-5 are simplified flowcharts illustrating a series of example steps associated with a method for intelligently establishing links for multicast services in the communication system. Starting with FIG. 4, a method 400 begins at step 402, where a given end user (in this example case, user A3 of VTG1 60) logs onto the system. Her respective communication resource manager A (of LAN A), in response to her logging in, brings up the WAN link at step 404. Note that the direction of this flow, or theme, is that the mere existence of a VTG does not automatically bring up the link. Thus, the fact that the VTG has been configured is not determinative of whether the link will be used.

At step 406, presence information is exchanged. In regards to 'presence' data more generally, presence information is a status indicator that conveys an ability and/or willingness of a potential communication partner to communicate. A user's client provides presence information (presence state) via a network connection to a presence service, which is stored in what constitutes his personal availability record. This can be made available for distribution to other users to convey his/her availability for communication. This presence data could involve virtually any type of communication capability (e.g., instant messaging or texting capabilities, related implementations of voice over IP, etc.). Current standards support a rich choice of additional presence attributes that can be used for presence information, such as user mood, location, or free text status. A user client may publish a presence state to indicate its current communication status. This published state informs others that wish to contact the user of his availability and willingness to communicate. The most common use of presence today is to display an indicator icon on instant messaging clients, typically from a choice of graphic symbol with an easy-to-convey meaning, and a list of corresponding text descriptions of each of the states.

Returning to FIG. 4, at step 408, communication resource manager B detects if users are present in VTG2 in LAN B. If there are no users present in LAN B, then the trunk is torn down at step 410. If there are users present, then the connection is kept up at step 412.

Similarly, in FIG. 5, a method 500 is provided that begins at step 502 where the dynamic trunk is up. At step 504, the presence of users on both sides is detected. If the answer is YES to this question, the flow continues in this fashion, until a NO answer is reached at step 506. At this juncture, the trunk is torn down and the flow ends.

Note that the examples of FIGS. 4-5 has been offered for purposes of teaching only. Accordingly, some of these steps may be changed, deleted, or replaced with other steps where appropriate. Such modifications may be based on particular communication needs or specific communication architectures and configurations and are within the teachings of the present invention.

Although the present invention has been described in detail with reference to particular embodiments, it should be understood that various other changes, substitutions, and alterations may be made hereto without departing from the spirit and scope of the present invention. For example, although the present invention has been described as operating in low-bandwidth environments, the present invention may be used in any networking environment that is cost sensitive. While the savings in a high bandwidth environment may not be as great as in an HLLB scenario, the teachings of the present invention can certainly be employed there. Moreover, the protocol disclosed in the preceding figures is generally applicable to all communication systems in which information packets are routed between or through IP networks. Note also that although specific protocols are described herein in this document to illustrate example operations, any suitable communicative platforms may be used to effectuate the operations, which provide an ability to provide multicast services for communication system 10.

In some instances, the WAN outlined above could be replaced (or used in conjunction with) a wireless local area network (WLAN), metropolitan area network (MAN), wide area network (WAN), virtual private network (VPN), or any other appropriate architecture or system that facilitates communications in a network environment.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
   a first communication resource manager located in a first domain and operable to interact with a second communication resource manager located in a second domain, wherein the first communication resource manager is configured to:
      determine to establish a link for multicasting between users in the first domain and users in the second domain based on presence data of at least one user in the first domain and at least one user in the second domain;
      determine an application to be used in a communication session over the link;
      allocate a bandwidth level to be used for the link to accommodate the application;
      increase the bandwidth level for the link based on a change in the application and based on an identification of additional presence data for additional users that have joined the communication session, wherein the communication resource managers each includes respective trunking element that is automatically configured to select a transcoding based on available bandwidth;
      adjust the bandwidth level based on a determination which of the additional users and the users in the first and second domains can transmit data simultaneously during the communication session;
      detect an absence of active users in the first domain and the second domain; and
      tear down the link based on the absence; wherein the link is a satellite communication link.

2. The apparatus of claim 1, wherein the users of the first domain comprise a virtual talking group (VTG).

3. The apparatus of claim 1, wherein the additional presence data relates to whether a given end user has logged into their respective system.

4. The apparatus of claim 1, wherein the communication resource managers each includes respective virtual talk group (VTG) presence managers (VPMs), each of which is operable to monitor their users who are present in their respective domains.

5. The apparatus of claim 4, wherein information received from the VPMs is used to maintain a designated link bandwidth allocation.

6. The apparatus of claim 4, wherein if either one of the VPMs determine that there are no active users logged into their respective systems, then the VPMs tear down the link.

7. The apparatus of claim 1, further comprising:
   a router that establishes the link based on direction from the communication resource manager.

8. A method to be executed in conjunction with a processor to perform the steps of, comprising:
   interacting, via a first communication resource manager located in a first domain, with a second communication resource manager located in a second domain;
   determining to establish a link for multicasting between users in the first domain and users in the second domain based on presence data of at least one user in the first domain and at least one user in the second domain;
   determining an application to be used in a communication session over the link;
   allocating a bandwidth level to be used for the link to accommodate the application;
   increasing the bandwidth level for the link based on a change in the application and based on an identification of additional presence data for additional users that have joined the communication session, wherein the communication resource managers each includes respective trunking element that is automatically configured to select a transcoding based on available bandwidth;
   adjusting the bandwidth level based on a determination which of the additional users and the users in the first and second domains can transmit data simultaneously during the communication session;
   detecting an absence of active users in the first domain and the second domain; and
   tearing down the link based on the absence; wherein the link is a satellite communication link.

9. The method of claim 8, wherein the link is a satellite communication link, and wherein the users of the first domain comprise a virtual talking group (VTG).

10. The method of claim 8, further comprising:
detecting whether a given end user has logged into their respective system in order to identify the additional presence data.

11. The method of claim 8, further comprising:
maintaining a designated link bandwidth allocation based on a number of users who are logged into their respective systems.

12. Non-transitory media that include instructions for execution and when executed by a processor operable to:
interact, via a first communication resource manager located in a first domain, with a second communication resource manager located in a second domain;
determine to establish a link for multicasting between users in the first domain and users in the second domain based on presence data of at least one user in the first domain and at least one user in the second domain;
determine an application to be used in a communication session over the link;
allocate a bandwidth level to be used for the link to accommodate the application;
increase the bandwidth level for the link based on a change in the application and based on an identification of additional presence data for additional users that have joined the communication session, wherein the communication resource managers each includes respective trunking element that is automatically configured to select a transcoding based on available bandwidth;
adjust the bandwidth level based on a determination which of the additional users and the users in the first and second domains can transmit data simultaneously during the communication session;
detect an absence of active users in the first domain and the second domain; and
tear down the link based on the absence; wherein the link is a satellite communication link.

13. The non-transitory media of claim 12, wherein the instructions for execution and when executed by the processor is further operable to:
detect whether a given end user has logged into their respective system in order to identify the additional presence data.

14. The non-transitory media of claim 12, wherein the instructions for execution and when executed by the processor is further operable to:
maintain a designated link bandwidth allocation based on a number of users who are logged into their respective systems.

15. A system, comprising:
means for interacting, via a first communication resource manager located in a first domain, with a second communication resource manager located in a second domain;
means for determining to establish a link for multicasting between users in the first domain and users in the second domain based on presence data of at least one user in the first domain and at least one user in the second domain, wherein the link is a satellite communication link, and wherein the users of the first domain comprise a virtual talking group (VTG);
means for determining an application to be used in a communication session over the link;
means for allocating a bandwidth level to be used for the link to accommodate the application;
means for increasing the bandwidth level for the link based on a change in the application and based on an identification of additional presence data for additional users that have joined the communication session, wherein the communication resource managers each includes respective trunking element that is automatically configured to select a transcoding based on available bandwidth;
means for adjusting the bandwidth level based on a determination which of the additional users and the users in the first and second domains can transmit data simultaneously during the communication session;
means for detecting an absence of active users in the first domain and the second domain; and
means for tearing down the link based on the absence.

* * * * *